May 15, 1928.  E. F. NIEDECKEN  1,669,772

VALVE

Filed Nov. 12, 1926

INVENTOR.
Edward F. Niedecken
BY
ATTORNEYS.

Patented May 15, 1928.

1,669,772

UNITED STATES PATENT OFFICE.

EDWARD F. NIEDECKEN, OF MILWAUKEE, WISCONSIN.

VALVE.

Application filed November 12, 1926. Serial No. 147,884.

This invention relates to an improvement in mixing valves of the type designed for use in supplying a mixture of hot and cold water as well as a stream of cold water alone or a stream of hot water alone whenever desired.

While several varieties of this type of valve have been heretofore proposed, no one of the mixing valves heretofore known in the art has had the capacity of supplying a fine stream of hot water. In other words, in the mixing valves heretofore known the water would first be supplied as a stream of cold water which could be controlled as to volume, then as a stream of mingled cold and hot water in which the proportions of cold and hot water could be varied to afford a supply of water of the desired temperature, and finally a heavy stream of hot water. This type of valve is very satisfactory for a great many purposes, but in some instances it is extremely desirable to have available to the user a stream of hot water of relatively small volume, and this, mixing valves heretofore were unable to supply.

One of the principal objects of the present invention is to provide a mixing valve which has the capacity to supply a controlled stream of cold water, a controlled stream of mingled hot and cold water in which the proportions of hot and cold water may be varied to obtain the desired temperature in the mixed stream, a full stream of hot water, and a controlled or throttled stream of hot water which may be reduced to a fine stream of relatively small volume.

A further object is to provide a mixing valve which has these advantages and yet possesses all of the advantages of the mixing valves heretofore known in the art.

A still further object is to provide a mixing valve of the character specified and which is of simple and durable construction, reliable and effective in operation, easy to control and adapted to be manufactured at a relatively slight expense from materials and by means of facilities ordinarily available.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1:
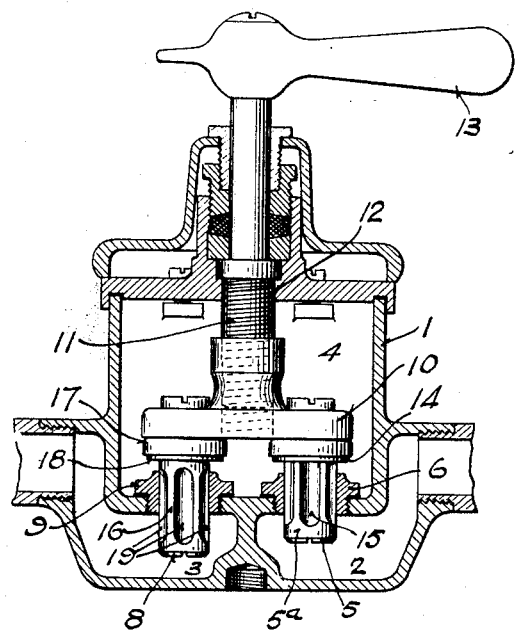
Figure 1 is a view partly in section and partly in elevation, showing one type of mixing valve embodying the present invention.
Figure 2:
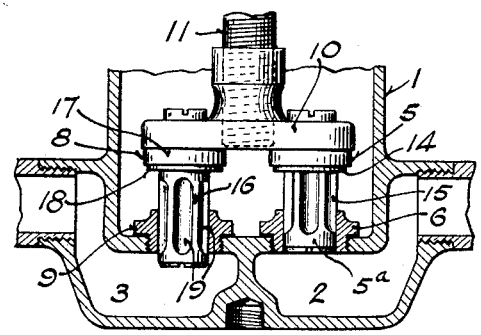
Fig. 2 is an enlarged sectional view of the valves and their seats and showing the hot water valve in a position to supply a stream of hot water of relatively small volume while the cold water valve is entirely shut off.

In the drawings a mixing valve is shown of the type forming the subject matter of my prior patents, of which Patent No. 1,054,023, granted February 25, 1913, will serve as an example. It is understood, however, that the present invention, in its broad aspects, is not restricted to any particular type of mixing valve, but has universal application.

As described in the patent referred to, the mixing valve comprises a casing 1 constructed and internally partitioned to provide a cold water inlet chamber 2 connected with the cold water supply, a hot water inlet chamber 3 connected to the hot water supply, and a mixing chamber 4 connected to the nozzle or faucet (not shown). Communication between the cold water inlet chamber 2 and the mixing chamber 4 is controlled by means of a graduating plug valve 5 which coacts with a valve seat 6 provided in and around the port which leads from the inlet chamber 2 to the mixing chamber 4. Similarly a graduated plug valve 8 coacts with a valve seat 9 disposed in and around the port which leads from the hot water inlet chamber 3 to the mixing chamber 4 for the purpose of controlling communication between the inlet chamber 3 and the mixing chamber 4.

The valves 5 and 8 are connected in the usual manner or in any approved manner with an actuating member which is shown as comprising a yoke or crosshead 10 carried at the lower end of a screw 11, the screw 11 being operatively fitted in a threaded bearing 12 carried by the casing 1 and being turned by means of a handle or operating member 13 to advance and retract the yoke 10. In this embodiment of the invention these parts are of conventional construction with the exception that the screw 11 is made a little longer to give it more lift than the conventional screw.

The graduating plug valve 5 which constitutes the cold water valve is of the usual construction and has a washer or disc 14 engageable with the valve seat 6 in one position of the valve. The shank or body of this graduating plug valve has the usual longitudinal grooves 15 which extend from the disc or washer 14 to a point adjacent to but spaced from the inner end of the body of the valve, the inner extremities of these grooves 15 being gradually reduced in size.

The graduating plug valve 8 which constitutes the hot water valve comprises an elongated shank or body 16 having a head 17 at its outer end, the head 17 being connected in the usual or in any approved manner to the crosshead 10. At the juncture of the head 17 and shank or body 16 a disc or washer 18 is provided and coacts with the valve seat 9 in one position of the hot water valve. As shown in the drawings, the shank or body of the hot water valve is longer than the shank or body of the cold water valve. The shank or body 16 has longitudinal grooves 19 therein, the grooves 19 extending from a point adjacent to but spaced from the washer 18 to a point adjacent to but spaced from the inner end of the body 16 of the hot water valve, both ends of the grooves being reduced in size. The reduction in size is a gradual one, the bottom wall of the groove gradually curving outward to the surface of the shank or body 16 and the side walls of the groove gradually converging.

With this arrangement, when the operating member 13 is turned as far as it may be to advance the crosshead 10 inwardly, the washers 14 and 18 are pressed firmly up against the seats 6 and 9 and both valves are closed so that no water of any kind flows into the mixing chamber 4. When the operating member 13 is turned to retract the crosshead 10 outwardly the washers 14 and 18 are pulled away from their valve seats and in the first phases of this operation cold water flows from the inlet chamber 2 into the mixing chamber due to the fact that the grooves 15 extend to the washer 14. The coaction of the washer 14 with its seat controls the initial stream of cold water, and by moving this washer toward and away from its seat the volume of the stream of cold water may be regulated, and varied and if desired, a stream of cold water of relatively small volume may be had. Further turning movement of the screw to retract the crosshead outwardly results in the admission of some hot water into the mixing chamber and the amount of hot water admitted at first is relatively small but may be gradually increased to obtain the desired mixture. By varying the proportions of hot and cold water the temperature of the water flowing from the nozzle or faucet connected with the mixing chamber may be varied. If the crosshead 10 is moved still farther outwardly the cold water valve is shut off as the ungrooved inner end portion 5$^a$ of the body of the valve 5 eventually comes into the valve seat and blocks its port to shut off the flow of cold water. When the flow of cold water is first shut off a stream of hot water alone is supplied to the mixing chamber and this stream is of the maximum volume that may be supplied as the unreduced portions of the grooves 19 are positioned at such time to convey the water from the hot water inlet chamber 3 to the mixing chamber 4. By still farther retracting the crosshead 10 outwardly, the stream of hot water may be throttled down since the tapered inner ends of the grooves 19 are thus brought into cooptive relation with the inner portion of the valve seat 9. During this time the cold water valve remains closed as it merely moves farther into its seat 6. This is the important feature of the present invention since by this last phase of the operation it is possible to provide a small stream of hot water of relatively small volume with the same mixing valve that affords a regulated stream of cold water and a regulated stream of mixed hot and cold water of the desired temperature.

The invention claimed is:

1. A mixing valve comprising a casing having an inlet chamber for cold water, an inlet chamber for hot water, and a mixing chamber, a cold water valve controlling communication between the cold water chamber and the mixing chamber in the usual manner, and a hot water valve controlling communication between the hot water chamber and the mixing chamber in the usual manner during all of the stages of the ordinary operation of the mixing valve and further characterized by the provision of means on the hot water valve designed to throttle down the flow of hot water to a stream of relatively small volume after the cold water valve has shut off the supply of cold water and as the hot water valve is moved beyond full open position.

2. A mixing valve comprising a casing having an inlet chamber for cold water, an inlet chamber for hot water, a mixing chamber, a cold water valve controlling communication between the cold water chamber and the mixing chamber in the usual manner, and a hot water valve longer than the cold water valve and controlling communication between the hot water chamber and the mixing chamber in the usual manner during all of the stages of the ordinary operation of the mixing valve, said hot water valve having means at its inner end designed to throttle down the flow of hot water to a stream of relatively small volume after the cold water valve has shut off the supply of cold water and as the hot water valve is moved beyond full open position.

3. A mixing valve comprising a casing having an inlet chamber for cold water, an inlet chamber for hot water, a mixing chamber, a cold water valve controlling communication between the cold water chamber and the mixing chamber in the usual manner, and a hot water valve longer than the cold water valve and controlling communication between the hot water chamber and the mixing chamber in the usual manner during all of the stages of the ordinary operation of the mixing valve, said hot water valve having means at its inner end designed to throttle down the flow of hot water to a stream of relatively small volume after the cold water valve has shut off the supply of cold water and as the hot water valve is moved beyond full open position, and operating means for said valves including an operating screw having a greater lift than the ordinary screw.

4. A mixing valve comprising a casing constructed and internally partitioned to define an inlet chamber for cold water, an inlet chamber for hot water and a mixing chamber, the partition between the chamber for cold water and the mixing chamber having a port affording communication between the cold water chamber and the mixing chamber, a valve seat positioned in and around said port, a cold water valve cooperable with said valve seat and comprising a graduating plug having a head provided with a washer and a body inwardly of the head and formed with longitudinal grooves extending inwardly from the washer to points adjacent to but spaced from the inner end of the body, the partition between the hot water inlet chamber and the mixing chamber having a port affording communication between such chambers, a valve seat positioned in and around said last-mentioned port, a hot water valve cooperable with said last-mentioned valve seat and comprising a head with a washer engageable with the seat and also having a body longer than the body of the cold water valve and formed with longitudinal grooves extending from points adjacent to but spaced from the washer and the inner end of the body of the hot water valve, both ends of each of said grooves of the hot water valve being gradually reduced, and operating mechanism for said valves.

5. A mixing valve comprising a casing constructed and internally partitioned to define an inlet chamber for cold water, an inlet chamber for hot water and a mixing chamber, the partition between the chamber for cold water and the mixing chamber having a port affording communication between the cold water chamber and the mixing chamber, a valve seat positioned in and around said port, a cold water valve cooperable with said valve seat and comprising a graduating plug having a head provided with a washer and a body inwardly of the head and formed with longitudinal grooves extending inwardly from the washer to points adjacent to but spaced from the inner end of the body, the partition between the hot water inlet chamber and the mixing chamber having a port affording communication between such chambers, a valve seat postioned in and around said last-mentioned port, a hot water valve cooperable with said last-mentioned valve seat and comprising a head with a washer engageable with the seat and also having a body longer than the body of the cold water valve and formed with longitudinal grooves extending from points adjacent to but spaced from the washer and the inner end of the body of the hot water valve, at least the inner end of each of said grooves of the hot water valve being gradually reduced whereby a stream of hot water of relatively small volume may be supplied into the mixing chamber, and operating mechanism for said valves.

6. A mixing valve comprising a casing constructed and internally partitioned to define an inlet chamber for cold water, an inlet chamber for hot water and a mixing chamber, the partition between the chamber for cold water and the mixing chamber having a port affording communication between the cold water chamber and the mixing chamber, a valve seat posititioned in and around said port, a cold water valve cooperable with said valve seat and comprising a graduating plug having a head provided with a washer and a body inwardly of the head and formed with longitudinal grooves extending inwardly from the washer to points adjacent to but spaced from the inner end of the body, the partition between the hot water inlet chamber and the mixing chamber having a port affording communication between such chambers, a valve seat positioned in and around said last-mentioned port, a hot water valve cooperable with said last-mentioned valve seat and comprising a head with a washer engageable with the seat and also having a body longer than the body of the cold water valve and formed with longitudinal grooves extending from points adjacent to but spaced from the washer and the inner end of the body of the hot water valve, at least the inner end of each of said grooves of the hot water valve being gradually reduced whereby a stream of hot water of relatively small volume may be supplied into the mixing chamber, and operating mechanism for said valves, and including a screw having sufficient lift to move the cold water valve through its entire range of movement and the hot water valve to a position where it coacts with its valve seat to supply a stream of hot water of small volume to the mixing chamber.

In witness whereof, I hereto affix my signature.

EDWARD F. NIEDECKEN.